(12) United States Patent
Nishio et al.

(10) Patent No.: US 11,359,785 B2
(45) Date of Patent: Jun. 14, 2022

(54) ILLUMINATION DEVICE

(71) Applicant: Dai Nippon Printing Co., Ltd., Tokyo (JP)

(72) Inventors: Shumpei Nishio, Tokyo (JP); Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/448,359

(22) Filed: Sep. 22, 2021

(65) Prior Publication Data

US 2022/0003373 A1 Jan. 6, 2022

Related U.S. Application Data

(63) Continuation of application No. 16/472,963, filed as application No. PCT/JP2017/047233 on Dec. 28, 2017, now Pat. No. 11,193,640.

(30) Foreign Application Priority Data

Jan. 5, 2017 (JP) .............................. JP2017-000671

(51) Int. Cl.
*F21S 41/00* (2018.01)
*F21S 41/16* (2018.01)
(Continued)

(52) U.S. Cl.
CPC ............. *F21S 41/16* (2018.01); *F21S 41/285* (2018.01); *G02B 5/18* (2013.01); *G02B 5/32* (2013.01);
(Continued)

(58) Field of Classification Search
CPC ...... G02B 5/18; G02B 5/1819; G02B 5/1814; G02B 5/32; F21S 41/16; F21S 41/285; G03H 1/0005
See application file for complete search history.

(56) References Cited

U.S. PATENT DOCUMENTS 10,599,024 B2 * 3/2020 Inoko .................. G03B 21/204
2004/0252744 A1 12/2004 Anikitchev et al.
(Continued)

FOREIGN PATENT DOCUMENTS

| EP | 2 043 094 A1 | 4/2009 |
|---|---|---|
| EP | 2 975 318 A1 | 1/2016 |

(Continued)

OTHER PUBLICATIONS

International Search Report and Written Opinion (Application No. PCT/JP2017/047233) dated Mar. 27, 2018.
(Continued)

*Primary Examiner* — Gerald J Sufleta, II
(74) *Attorney, Agent, or Firm* — Burr & Brown, PLLC

(57) ABSTRACT

An illumination device includes: laser light sources having different radiant fluxes; and diffractive optical elements provided correspondingly to the respective laser light sources. A planar dimension of the diffractive optical element, which corresponds to the laser light source that emits a laser light having a minimum radiant flux, is smaller than a planar dimension of the diffractive optical element, which corresponds to the laser light source that emits a laser light having a maximum radiant flux.

12 Claims, 3 Drawing Sheets

(51) Int. Cl.
 F21S 41/20 (2018.01)
 G02B 5/18 (2006.01)
 G02B 5/32 (2006.01)
 G03H 1/00 (2006.01)
 G03H 1/16 (2006.01)
(52) U.S. Cl.
 CPC ............ *G03H 1/0005* (2013.01); *G03H 1/16* (2013.01); *G03H 2226/02* (2013.01); *G03H 2260/12* (2013.01)

(56) References Cited

U.S. PATENT DOCUMENTS

| | | |
|---|---|---|
| 2008/0013415 A1 | 1/2008 | Nomura et al. |
| 2008/0239244 A1 | 10/2008 | Yamauchi et al. |
| 2013/0265438 A1 | 10/2013 | Sugiyama |
| 2014/0118702 A1 | 5/2014 | Taniguchi et al. |
| 2016/0018075 A1 | 1/2016 | Ohno |
| 2016/0370593 A1* | 12/2016 | Sekine .................. G02B 5/04 |
| 2017/0144253 A1 | 5/2017 | Martinsen et al. |
| 2017/0315375 A1 | 11/2017 | Kurashige et al. |
| 2017/0334341 A1 | 11/2017 | Kurashige et al. |
| 2018/0188525 A1 | 7/2018 | Kurashige |
| 2018/0195694 A1 | 7/2018 | Jutte et al. |

FOREIGN PATENT DOCUMENTS

| | | |
|---|---|---|
| JP | 2003-218017 A1 | 7/2003 |
| JP | 2008-268878 A1 | 11/2008 |
| JP | 2015-132707 A1 | 7/2015 |
| JP | 2016-024929 A1 | 2/2016 |
| JP | 2016-088396 A1 | 5/2016 |
| JP | WO 2016/072484 A1 | 5/2016 |
| JP | WO 2016/072505 A1 | 5/2016 |
| JP | 2016-107777 A1 | 6/2016 |
| WO | 2016/072503 A1 | 5/2016 |
| WO | 2016/208594 A1 | 12/2016 |

OTHER PUBLICATIONS

English translation of International Preliminary Report on Patentability (Chapter I) (Application No. PCT/JP2017/047233) dated Jul. 18, 2019.
CD-RW (Compact Disc-ReWritable) dated Jul. 17, 2020.
DVD Recorder dated Jul. 17, 2020.
Extended European Search Report (Application No. 17890379.5) dated Jul. 27, 2020.
Chinese Office Action (Application No. 201780079510.4) dated Feb. 3, 2021 (with English translation).

* cited by examiner

ILLUMINATION DEVICE

CROSS REFERENCE TO RELATED APPLICATION

This application is a continuation of U.S. application Ser. No. 16/472,963, filed Jun. 24, 2019, which in turn is the National Stage entry of International Application No. PCT/JP2017/047233, filed Dec. 28, 2017, which designated the United States, the entireties of which are incorporated herein by reference.

FIELD OF THE INVENTION

The present invention relates to an illumination device.

BACKGROUND OF THE INVENTION

As disclosed in Patent Document 1 (JP2015-132707A), for example, an illumination device including a light source and a hologram element is known. In the illumination device disclosed in Patent Document 1, the hologram element diffracts a light (light beam) from the light source, so that a road surface can be illuminated with a desired pattern. In the illumination device disclosed in Patent Document 1, a laser light generated by the single light source is diffracted by the single hologram element.

When a light source that projects a laser light is used, an area to be illuminated can be brightly illuminated. However, when a person looks straight at the illumination light from the illumination device, his/her eyes may be damaged. In consideration of safety, a hologram element preferably has a large planar dimension so that the hologram element can have a large incident area (spot area) for a light-source light. However, the large planar dimension of the hologram element disadvantageously enlarges a size of the illumination device as a whole. The problem of enlargement in size of the illumination device becomes more serious in an illumination device that performs illumination with a specific color by means of additive color mixture using lights of various wavelength ranges.

SUMMARY OF THE INVENTION

The embodiment of the disclosure has been made in consideration of the above circumstances. The object of the present invention is to reduce a size of an illumination device while considering safety.

An illumination device according to the embodiment of the disclosure comprises:

laser light sources that emit laser lights of different radiant fluxes; and diffractive optical elements provided correspondingly to the respective laser light sources;

wherein a planar dimension of the diffractive optical element, which corresponds to the laser light source that emits a laser light having a minimum radiant flux, is smaller than a planar dimension of the diffractive optical element, which corresponds to the laser light source that emits a laser light having a maximum radiant flux.

In the illumination device according to the embodiment of the disclosure, after the lights emitted from the respective laser light sources have been diffracted by the diffractive optical elements corresponding to the respective laser light sources, the lights may illuminate areas that are at least partially overlapped.

In the illumination device according to the embodiment of the disclosure, after the lights emitted from the respective laser light sources have been diffracted by the diffractive optical elements corresponding to the respective laser light sources, the lights may illuminate the same area to be illuminated.

In the illumination device according to the embodiment of the disclosure, after the lights emitted from the respective laser light sources have been diffracted by the diffractive optical elements corresponding to the respective laser light sources, the lights may illuminate only the whole area of the same area to be illuminated.

In the illumination device according to the embodiment of the disclosure, when the minimum radiant flux is represented as $W_{min}$ [W] and the maximum radiant flux is represented as $W_{max}$ [W], a planar dimension $A_{min}$ [mm$^2$] of the diffractive optical element, which corresponds to the laser light source that emits a laser light having the minimum radiant flux, and a planar dimension $A_{max}$ [mm$^2$] of the diffractive optical element, which corresponds to the laser light source that emits a laser light having the maximum radiant flux, may satisfy the following relationship:

$$A_{max} \times (W_{min}/W_{max}) \leq A_{min}.$$

In the illumination device according to the embodiment of the disclosure, a planar dimension of the diffractive optical element, which corresponds to one optionally selected laser light source, may be not more than a planar dimension of the diffractive optical element, which corresponds to another laser light source that emits a laser light having a radiant flux larger than that of a laser light emitted by the one laser light source.

The illumination device according to the embodiment of the disclosure may further comprise a shaping optical system that expands laser lights emitted from the laser light sources, and guides the laser lights to the diffractive optical elements.

In the illumination device according to the embodiment of the disclosure, the laser light sources may emit laser lights of different wavelength ranges.

In the illumination device according to the embodiment of the disclosure, the laser light source, which emits a laser light having the minimum radiant flux, may emit a laser light of a red emission wavelength range, and the laser light source, which emits a laser light having the maximum radiant flux, may emit a laser light of a blue emission wavelength range.

In the illumination device according to the embodiment of the disclosure, the illumination device may illuminate an area to be illuminated, and a distance from the area to be illuminated to the diffractive optical element, which corresponds to the laser light source that emits a laser light having the minimum radiant flux, may be larger than a distance from the area to be illuminated to the diffractive optical element, which corresponds to the laser light source that emits a laser light having the maximum radiant flux.

According to the embodiment of the disclosure, the illumination device can be reduced in size while considering the safety.

DETAILED DESCRIPTION OF THE INVENTION

Figure 1:
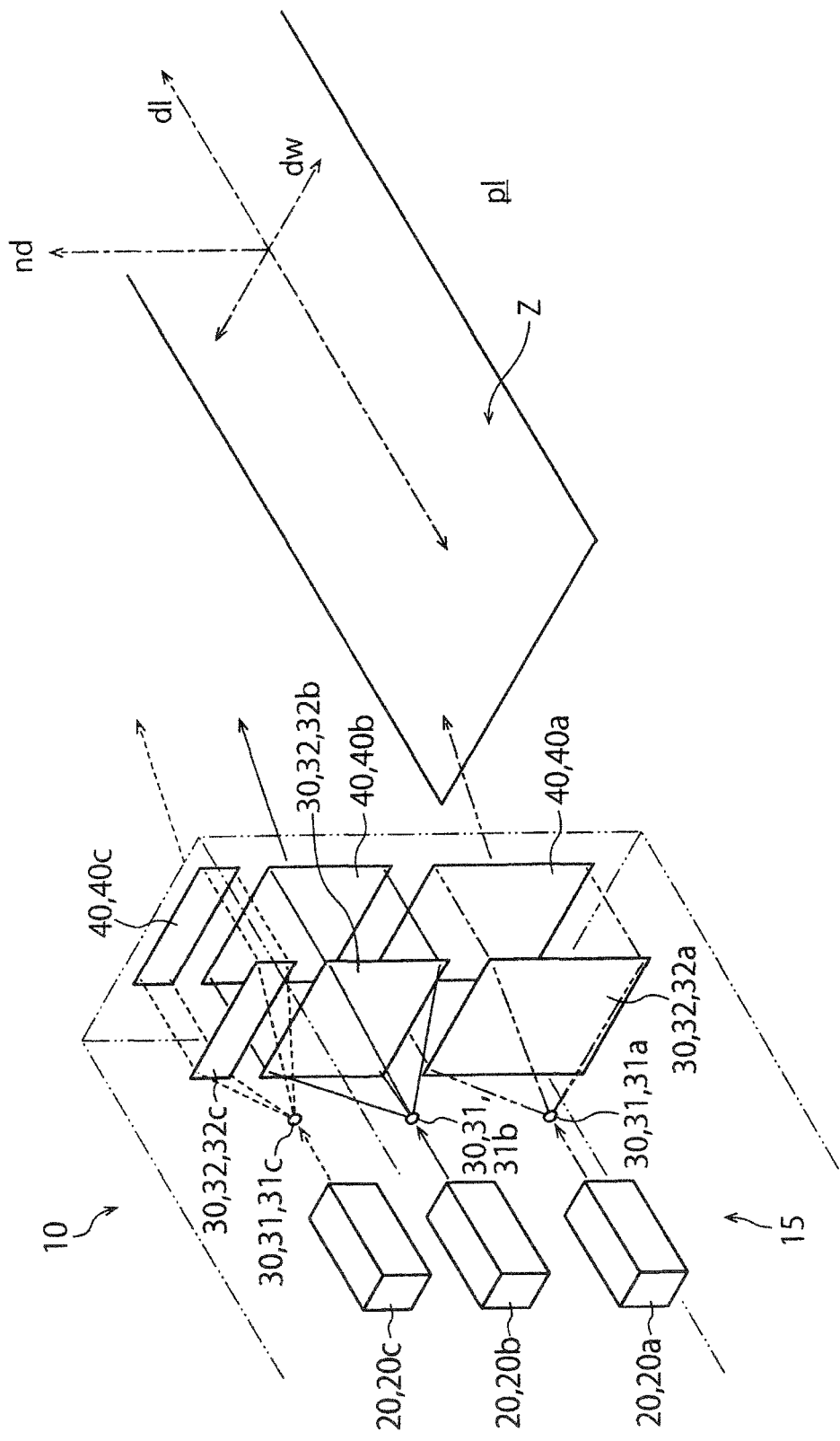
FIG. 1 is a perspective view showing an illumination device, for explaining an embodiment of the disclosure.

An embodiment of the disclosure is described herebelow with reference to the drawings. In the drawings attached to the specification, a scale size, an aspect ratio and so on are changed and exaggerated from the actual ones, for the convenience of easiness in illustration and understanding.

Further, terms specifying shapes, geometric conditions and their degrees, e.g., "parallel", "orthogonal", "same", etc. and a value of a length, an angle, etc., are not limited to their strict definitions, but are to be construed to include a range capable of exerting a similar function.

FIG. 1 is a perspective view schematically showing an overall structure of an illumination device 10. The illumination device 10 is a device that illuminates an area to be illuminated Z. In the illustrated example, the area to be illuminated Z is an elongated area having a longitudinal direction dl. The area to be illuminated Z is, for example, an area to be illuminated Z in which a ratio of a length of the longitudinal direction dl with respect to a length of a width direction dw is not less than 10 or even not less than 100. The area to be illuminated Z is typically a linear area to be illuminated Z. Such an illumination device can be applied to a vehicle such as an automobile or a ship. A vehicle needs to illuminate an area that extends forward a traveling direction. In particular, a headlight or a headlamp of an automobile that runs at a high speed is desired to brightly illuminate a forward road surface from near to far of the automobile.

As shown in FIG. 1, the illumination device 10 has a light source device 15 that projects a light or light beam, and a diffractive optical element 40 that diffracts a light from the light source device 15 and directs the light to the area to be illuminated Z. The light source device 15 has a laser light source 20, and a shaping optical system 30 that shapes a light emitted from the laser light source 20.

As shown in FIG. 1, the light source device 15 has a plurality of the laser light sources 20. A laser light projected from the laser light source has excellent straightness and thus is suited to accurately illuminate the area to be illuminated Z. The laser light sources 20 may either be independently provided, or be a light source module in which the laser light sources 20 are arranged on a common substrate. For example, the laser light sources 20 have a first laser light source 20a that oscillates a light of a red emission wavelength range, a second laser light source 20b that oscillates a light of a green emission wavelength range, and a third laser light source 20c that oscillates a light of a blue emission wavelength range. According to this example, by superimposing three laser lights projected from the laser light sources 20, the area to be illuminated Z can be illuminated with an illumination light of a desired color. By adjusting radiant fluxes [unit: W] of laser lights emitted from the laser light sources 20, a color of the illumination light can be adjusted.

Note that, not limited to the above example, the light source device 15 may have two laser light sources 20 or not less than four laser light sources 20 having emission wavelength ranges different from one another. In addition, in order to increase a light intensity, a plurality of the laser light sources 20 may be provided for each of the emission wavelength ranges.

Next, the shaping optical system 30 is described. The shaping optical system 30 shapes a laser light emitted from the laser light sources 20. In other words, the shaping optical system 30 shapes a shape of a laser light in a cross-section orthogonal to an optical axis, and a three-dimensional shape of a luminous flux of a laser light. In the illustrated example, the shaping optical system 30 shapes a laser light emitted from the laser light source 20 into a parallel luminous flux having a larger width. As shown in FIG. 1, the shaping optical system 30 has a lens 31 and a collimation lens 32 in this order along an optical path of a laser light. The lens 31 shapes a laser light emitted from the laser light source 20 into a divergent luminous flux. The collimation lens 32 reshapes the divergent luminous flux generated by the lens 31 into a parallel luminous flux.

In the illustrated example, the light source device 15 has a first shaping optical system 30a, a second shaping optical system 30b and a third shaping optical system 30c, correspondingly to the first to third laser light sources 20a to 20c. The first shaping optical system 30a has a first lens 31a and a first collimation lens 32a. The second shaping optical system 30b has a second lens 31b and a second collimation lens 32b. The third shaping optical system 30c has a third lens 31c and a third collimation lens 32c.

Next, the diffractive optical element 40 is described. The diffractive optical element 40 is an element that performs a diffraction action on a light emitted from the light source device 15. The illustrated diffractive optical element 40 diffracts a light from the light source device 15 and directs the light to the area to be illuminated Z. Thus, the area to be illuminated Z is illuminated with a light that is diffracted by the diffraction light source element 40.

In the illustrated example, the illumination device 10 has a plurality of the diffractive optical elements 40. To be more specific, the illumination device 10 has a first diffractive optical element 40a, a second diffractive optical element 40b and a third diffractive optical element 40c. The diffractive optical elements 40a, 40b and 40c are respectively provided to correspond to the laser light sources 20a, 20b and 20c that oscillate laser lights. According to this example, when the laser light sources 20a, 20b and 20c oscillate laser lights of different wavelength ranges, the diffractive optical elements 40a, 40b and 40c can respectively diffract corresponding laser lights of different wavelength ranges efficiently.

After the lights emitted respectively from the laser light sources 20a, 20b and 20c have been diffracted by the diffractive optical elements 40a, 40b and 40c corresponding to the respective laser light sources, the light illuminate areas that are at least partially overlapped. Particularly in the illustrated example, lights emitted respectively from the laser light sources 20a, 20b and 20c are diffracted by the diffractive optical elements 40a, 40b and 40c corresponding to the respective laser light sources, and then illuminate the same area to be illuminated Z. More strictly, the diffracted lights having been diffracted by the respective diffractive optical elements 40a, 40b and 40c illuminate only the whole area of the same area to be illuminated Z. Since each of the diffracted lights from each of the diffractive optical elements 40a, 40b and 40c illuminates only the area to be illuminated Z as a whole, non-uniformity in brightness and non-uniformity in color in the area to be illuminated Z can be efficiently made unnoticeable.

Figure 2:
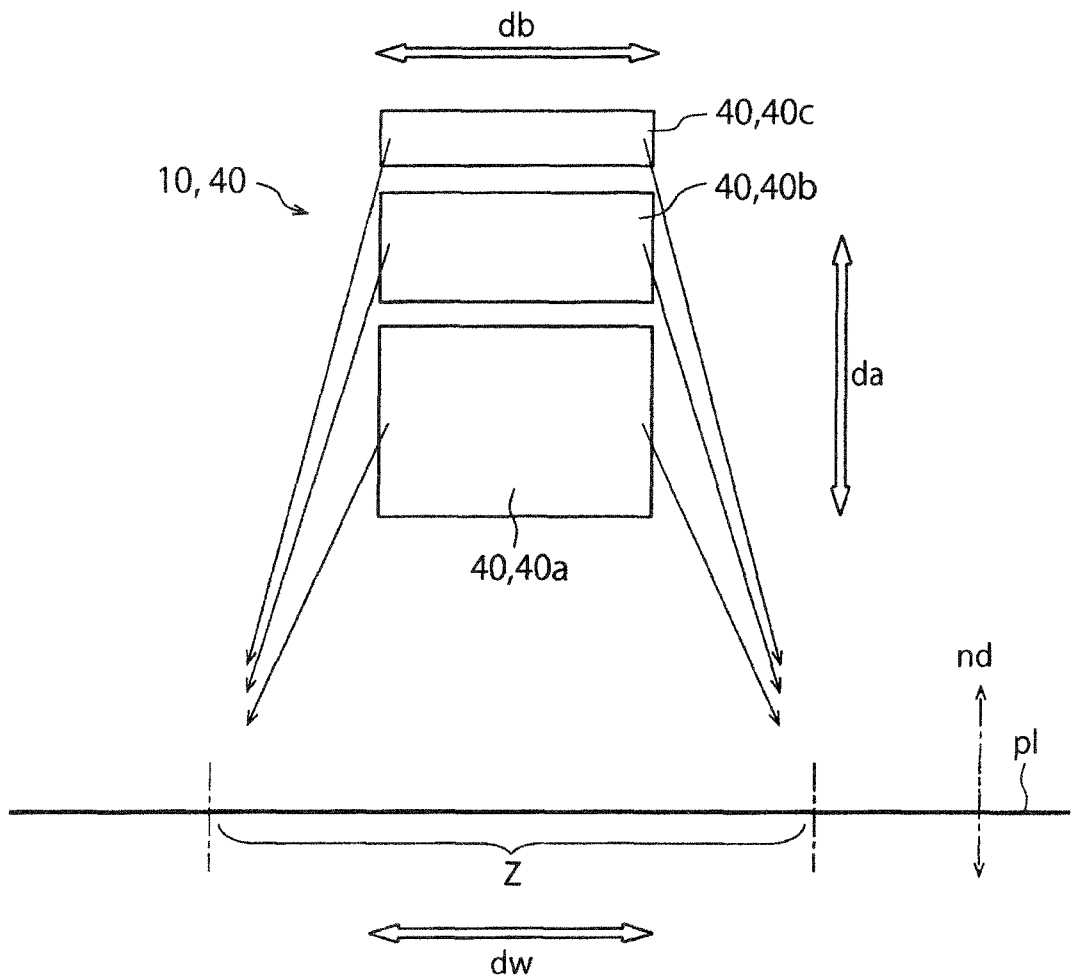
FIG. 2 is a front view showing the illumination device of FIG. 1.

In the example shown in FIGS. 1 and 2, the diffractive optical elements 40 are arranged in a first direction da that is perpendicular to the longitudinal direction dl of the area to be illuminated Z. In addition, the first direction da along which the diffractive optical elements 40 are arranged is parallel with a normal direction nd that is normal to a plane pl which is a flat plane on which the area to be illuminated Z is positioned. Particularly in the illustrated example, the first direction da along which the diffractive optical elements 40 are arranged is a vertical direction perpendicular to a horizontal direction. Namely, in the illustrated specific example, the horizontal plane pl such as a ground or a water surface is illuminated by diffracted lights from the diffractive optical elements 40 that are disposed vertically above the ground or the water surface, so that the area to be illuminated Z is formed on the horizontal plane pl. The diffractive optical elements 40 are vertically displaced from one another.

The area to be illuminated Z can be considered as an area to be illuminated of a near field that is illuminated by the diffractive optical elements 40. As described below, the area to be illuminated Z can be expressed not only by an actual planar dimension to be illuminated (illumination range) but also by a diffusion angle range in an angular space having certain coordinate axes.

For example, each diffractive optical element 40 may be constituted as a hologram recording medium that records an interference fringe pattern. By variously adjusting the interference fringe pattern, a traveling direction of a light that is diffracted by each diffractive optical element 40, in other words, a traveling direction of a light that is diffused by each diffractive optical element 40 can be controlled.

For example, each diffractive optical element 40 can be produced by using, as an object light, a scattered light from an actual scattering plate. To be more specific, when a hologram photosensitive material, which is a matrix of the diffractive optical element 40, is illuminated with a reference light, which is a coherent light, and an object light interfering with each other, an interference fringe by coherence of the lights is formed in the hologram photosensitive material, so that the diffractive optical element 40 is produced. As a reference light, a laser light which is a coherent light is used. On the other hand, as an object light, a scattered light scattered from an economically available isotropic scattering plate is used, for example.

By projecting a laser light toward the diffractive optical element 40 such that the laser light travels conversely to an optical path of the reference light used when the diffractive optical element 40 was produced, a reconstructed image of the scattering plate is generated at a position on which the scattering plate, which originated the object light used when the diffractive optical element 40 was produced, is located. When the scattering plate, which originated the object light used when the diffractive optical element 40 was produced, uniformly scattered the light planarly, the reconstructed image of the scattering plate, which is obtained by the diffractive optical element 40, is also a uniform plane illumination. An area in which the reconstructed image of the scattering plate is generated can provide the area to be illuminated Z.

Instead of being formed by using a real object light and a reference light, a complicated interference fringe pattern formed on each diffractive optical element 40 can be designed by using a computer based on a wavelength and an incident direction of expected illumination light to be reconstructed as well as a shape and a position of an image to be reconstructed. The diffractive optical element 40 thus obtained is also referred to as computer generated hologram (CGH). For example, when the illumination device 10 is used for illuminating an area to be illuminated Z having a certain size on a ground or a water surface, it is difficult to generate an object light, and thus a computer generated hologram is preferably used as the diffractive optical element 40.

In addition, a Fourier conversion hologram in which respective points on each diffractive optical element 40 have the same diffusion angle properties may be generated by a computer. Further, an optical member such as a lens may be disposed on the downstream side of the diffractive optical element 40, in order that a diffracted light is incident on the overall area to be illuminated Z.

Specifically, the diffractive optical element 40 may be a volume type hologram recording medium using a photopolymer, a volume type hologram recording medium that uses a photosensitive medium containing a silver salt material for recording, or a relief type (emboss type) hologram recording medium. In addition, the diffractive optical element 40 may be of a transmission type or of a reflection type.

Next, an operation of the illumination device 10 having the above structure is described.

A laser light emitted from each laser light source 20 is firstly incident on the corresponding shaping optical system 30. The shaping optical system 30 expands the laser light emitted from the laser light source 20. Namely, the shaping optical system 30 shapes the laser light such that an area occupied by the light spreads in a cross-section perpendicular to the optical axis. In the illustrated example, the shaping optical system 30 includes the first shaping optical system 30a, the second shaping optical system 30b and the third shaping optical system 30c that are separately provided correspondingly to the respective laser light sources 20a, 20b and 20c. Each shaping optical system 30 has the lens 31 and the collimation lens 32. As shown in FIG. 1, the lens 31 of the shaping optical system 30 diverges the laser light emitted from the laser light source 20 into a divergent luminous flux. The collimation lens 32 of the shaping optical system 30 collimates the divergent luminous flux into a parallel luminous flux.

The laser light shaped by the shaping optical system 30 is then directed to the diffractive optical element 40. The diffractive optical element 40 includes the first diffractive optical element 40a, the second diffractive optical element 40b and the third diffractive optical element 40c that are separately provided correspondingly to the respective laser light sources 20a, 20b and 20c. Each diffractive optical element 40 records an interference fringe corresponding to a center wavelength of the laser light emitted from the corresponding laser light source 20, and can efficiently diffract the laser light that is incident thereon from a certain direction such that the laser light is directed in a desired direction. In the illustrated example, each diffractive optical element 40 diffuses the laser light over the same overall area to be illuminated Z positioned on the horizontal plane pl such as a ground or a water surface.

As a result, since the laser light emitted from the first laser light source 20a, the laser light emitted from the second laser light source 20b and the laser light emitted from the third light source 20c are superimposed, the area to be illuminated Z can be illuminated with a color that cannot be reproduced by a laser light emitted from a single laser light source. The illumination light can have a desired color, by suitably adjusting a radiant flux of the laser light emitted from the first laser light source 20a, a radiant flux of the laser light emitted from the second laser light source 20b and a radiant flux of the laser light emitted from the third laser light source 20c, in other words, by adjusting an output of each laser light source so as to adjust a radiant flux of a laser light emitted therefrom.

In the illumination device 10 described herein, an optical path of a laser light emitted from the laser light source 20 is adjusted by the diffractive optical element 40 so as to illuminate the area to be illuminated Z. One of the advantages of the use of the diffractive optical element 40 is that a light energy density of a light, such as a laser light from the light source device 15, can be lowered by diffusion. In addition, another advantage is that the diffractive optical element 40 can serve as a directional surface light source. Namely, when a person looks straight at a laser light from the area to be illuminated Z, the laser light is emitted not from a point light source but from a surface light source having a size of the diffractive optical element 40. Thus, a laser light of the same radiant flux can be converted by means of the diffractive optical element 40 to an illumination light emitted from a broader light emission surface. As a result, as compared with illumination by means of a point light source (lamp light source), a brightness, i.e., a power density at each position on the light source surface for achieving the same illumination distribution can be lowered. For this reason, when the laser light source 20 is used as a light source, the use of the diffractive optical element 40 can contribute to safety improvement of a laser light.

By increasing a planar dimension of the diffractive optical element 40, an incident area for a laser light from the light source device 15, i.e., a spot area can be increased. The laser light incident on the diffractive optical element 40 is diffracted by the diffractive optical element 40, and emerges from the whole incident area on the diffractive optical element 40 toward the area to be illuminated Z. Thus, by increasing the planar dimensions of the incident surface and the emergent surface of the diffractive optical element 40, a power density at each position on the diffractive optical element 40 can be lowered.

However, on the other hand, when the diffractive optical element 40 has an increased planar dimension, the illumination device 10 enlarges in size. In the aforementioned illumination device 10 which performs illumination with a specific color by means of additive color mixture using light of various wavelength ranges, the problem of enlargement in size of the illumination device becomes more serious.

In this embodiment, the lowering of a power density and the reduction in size of the illumination device 10, which are in a trade-off relationship, can be made compatible. Namely, in this embodiment, depending on a value of a radiant flux of a laser light emitted by the laser light source 20, a planar dimension of the diffractive optical element 40 corresponding to the laser light source 20 is varied, so as to make compatible the lowering of a power density and the reduction in size of the illumination device 10. A specific structure is described herebelow.

The term "a radiant flux of a laser light" herein does not mean a maximum radiant flux that can be emitted by a laser light source. In other words, the term "a radiant flux of a laser light" does not mean a capacity of a laser light source. The term "a radiant flux of a laser light" herein means a radiant flux of a laser light that is actually emitted from a laser light source whose output is adjusted depending on an illumination purpose.

Firstly, a planar dimension of a diffractive optical element, which corresponds to a laser light source that emits a laser light having a minimum radiant flux among laser lights emitted respectively by the laser light sources 20 included in the illumination device 10, is smaller than a planar dimension of a diffractive optical element, which corresponds to a laser light source that emits a laser light having a maximum radiant flux among laser lights emitted respectively by the laser light sources 20 included in the illumination device 10. In the illustrated example, a radiant flux of a laser light of a red wavelength range, which is emitted from the first laser light source 20a, is the largest, and a radiant flux of a laser light of a blue wavelength range, which is emitted from the third laser light source 20c, is the smallest. Thus, planar dimensions of the incident surface and the emergent surface of the third diffractive optical element 40c, which corresponds to the third laser light source 20c that oscillates a laser light having a minimum radiant flux, is smaller than planar dimensions of the incident surface and the emergent surface of the first diffractive optical element 40a, which corresponds to the first laser light source 20a that oscillates a laser light having a maximum radiant flux.

As described above, when the emergent area on the emergent surface of the diffractive optical element 40 is increased, a power density can be lowered. Thus, by deciding sizes of the emergent surface of the diffractive optical element 40 and the incident surface thereof, which is generally the same area as the emergent surface, in consideration of a value of a radiant flux of the laser light source 20, the safety of the illumination device 10 can be enhanced. On the other hand, when a radiant flux of a laser light emitted from the third laser light source 20c is smaller than a radiant flux of a laser light emitted from the first laser light source 20a, from the viewpoint of lowering a power density at a position on the diffractive optical element, it is not necessary for the third diffractive optical element 40c corresponding to the third laser light source 20c to have a planar dimension that is about the same as a planar dimension of the first diffractive optical element 40a corresponding to the first laser light source 20a. Since the planar dimensions of the incident surface and the emergent surface of the third diffractive optical element 40c are reduced, in other words, since a planar dimension of the planar shape of the third diffractive optical element 40c is reduced, the illumination device 10 can be reduced in size, avoiding its unnecessary enlargement in size.

Further, when the minimum radiant flux of a laser light emitted from the third laser light source 20c is represented as $W_{min}$ [W], and the maximum radiant flux of a laser light emitted from the first laser light source 20a is represented as $W_{max}$ [W], a planar dimension $A_{min}$ [mm$^2$] of the third diffractive optical element 40c, which corresponds to the third laser light source 20c that emits a laser light having the minimum radiant flux, and a planar dimension $A_{max}$ [mm$^2$] of the first diffractive optical element 40a, which corresponds to the first laser light source 20a that emits a laser light having the maximum radiant flux, satisfy the following relationship:

$$A_{max} \times (W_{min}/W_{max}) \leq A_{min}.$$

Namely, on the assumption that the whole area of the first diffractive optical element 40a is effectively used, i.e., on the assumption that a laser light is expanded over the whole area of the incident surface of the first diffractive optical element 40a and is incident thereon at a uniform intensity, a value of a power density at each position on the first diffractive optical element 40a is represented by ($W_{max}/A_{max}$) as an index. Thus, the planar dimension $A_{max}$ of the first diffractive optical element 40a should be decided such that the index ($W_{max}/A_{max}$) has a sufficient value. As described above, the third diffractive optical element 40c has a planar dimension smaller than that of the first diffractive optical element 40a. It is preferable that a power density at each position on the third diffractive optical element 40c is set to be not more than a power density at each position on the first diffractive optical element 40a. A value of a power density at each position on the third diffractive optical element 40c on which a laser light having a minimum radiant flux is incident is represented by ($W_{min}/A_{min}$) as an index. When the planar dimension $A_{min}$ of the third diffractive optical element 40c satisfies the aforementioned condition so as to be not less than "$A_{max}\times(W_{min}/W_{max})$", a power density at each position on the third diffractive optical element 40c can be made not more than a power density at each position on the first diffractive optical element 40a. Namely, when the aforementioned condition is satisfied, the first diffractive optical element 40a, which corresponds to the first laser light source 20a having a maximum radiant flux and thus has relatively a larger planar dimension, can have a planar dimension that is reduced as much as possible, and simultaneously therewith, the third diffractive optical element 40c, which corresponds to the third laser light source 20c having a minimum radiant flux and thus has relatively a smaller planar dimension, can have a sufficiently lowered power density.

Further, in this embodiment, a planar dimension of the diffractive optical element 40, which corresponds to one optionally selected laser light source 20, is not more than a planar dimension of the diffractive optical element 40, which corresponds to another laser light source 20 having a radiant flux larger than that of the one laser light source 20. Namely, as a radiant flux of the laser light source 20 becomes smaller, a planar dimension of the corresponding diffractive optical element 40 becomes smaller. In other words, as a radiant flux of the laser light source 20 becomes larger, a planar dimension of the corresponding diffractive optical element 40 becomes larger.

Figure 3:
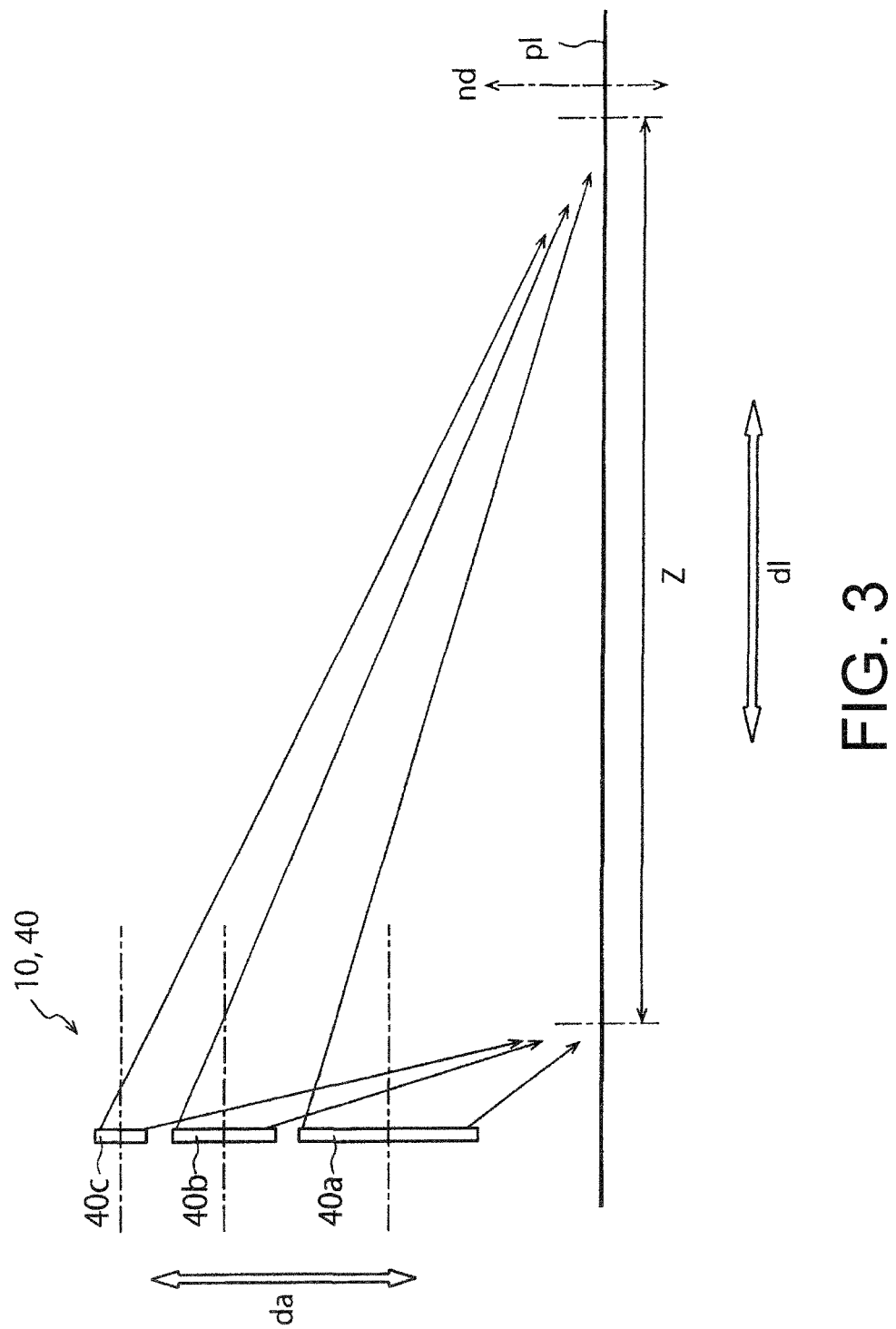
FIG. 3 is a side view showing the illumination device of FIG. 1.

In the illustrated example, a radiant flux of a laser light emitted from the second laser light source 20b is smaller than a radiant flux of a laser light emitted from the first laser light source 20a, and is larger than a radiant flux of a laser light emitted from the third laser light source 20c. Namely, the radiant flux of a laser light decreases in the order of the first laser light source 20a, the second laser light source 20b and the third laser light source 20c. As shown in FIGS. 2 and 3, in the illustrated example, the planar dimension decreases in the order of the first diffractive optical element 40a, the second diffractive optical element 40b and the third diffractive optical element 40c. According to such an illumination device 10, a power density at each position on each diffractive optical element 40 can be sufficiently lowered, and simultaneously therewith, a planar dimension of each diffractive optical element 40 can be effectively reduced.

Further, a radiant flux $W_a$ of a laser light emitted from the first laser light source 20a, a radiant flux $W_b$ of a laser light emitted from the second laser light source 20b, a radiant flux $W_c$ of the third laser light source 20c, a planar dimension $A_a$ of the first diffractive optical element 40a, a planar dimension $A_b$ of the second diffractive optical element 40b and a planar dimension $A_c$ of the third diffractive optical element 40c ideally satisfy the following relationship:

$W_a:W_b:W_c=A_a:A_b:A_c.$

As a specific example, in the illustrated illumination device 10, a radiant flux $W_a$ of a laser light emitted from the first laser light source 20a, a radiant flux $W_b$ of a laser light emitted from the second laser light source 20b and a radiant flux $W_c$ of the third laser light source 20c have a relationship of 7:4:2. A planar dimension ratio of the first diffractive optical element 40a, the second diffractive optical element 40b and the third diffractive optical element 40c is 7:4:2. As shown in FIG. 2, the first diffractive optical element 40a, the second diffractive optical element 40b and the third diffractive optical element 40c have the same length in a second direction db that is parallel with the width direction dw of the area to be illuminated Z. On the other hand, as shown in FIG. 3, a ratio of the lengths along the first direction da of the first diffractive optical element 40a, the second diffractive optical element 40b and the third diffractive optical element 40c is 7:4:2. According to such an illumination device 10, the diffractive optical elements 40 have a uniform power density. Thus, by allowing the power density to have a sufficient value, the planar dimensions of the diffractive optical elements 40 included in the illumination device 10 can be reduced.

In the aforementioned embodiment described above, the illumination device 10 has the laser light sources 20 that emit laser lights of different radiant fluxes, and the diffractive optical elements 40 provided correspondingly to the respective laser light sources. A planar dimension of the diffractive optical element 40, which corresponds to the laser light source 20 that emits a laser light having a minimum radiant flux, is smaller than a planar dimension of the diffractive optical element 40, which corresponds to the laser light source 20 that emits a laser light having a maximum radiant flux. Namely, in the illumination device 10, depending on a radiant flux of a laser light emitted by the laser light source 20, a planar dimension of the diffractive optical element 40 corresponding thereto is varied. Thus, a power density at each position of each diffractive optical element 40 can be effectively lowered. In addition, unnecessary increase in planar dimension of the diffractive optical element 40, which corresponds to the laser light source 20 that emits a laser light having a lower radiant flux, can be effectively avoided. As a result, the illumination device 10 can be effectively reduced in size, while ensuring the safety. As particularly in the illustrated example, when the area to be illuminated Z is illuminated with a specific color by means of additive color mixture, a radiant flux of a laser light emitted by each laser light source 20 is suitably adjusted, depending on a wavelength range of a laser light to be generated. When including the laser light sources 20 of a plurality of wavelength ranges, the illumination device 10 according to this embodiment is particularly useful.

In addition, in the aforementioned embodiment, when the minimum radiant flux is represented as $W_{min}$ [W], and the maximum radiant flux is represented as $W_{max}$ [W], a planar dimension $A_{min}$ [mm$^2$] of the diffractive optical element 40, which corresponds to the laser light source 20 that emits a laser light having the minimum radiant flux, and a planar dimension $A_{max}$ [mm$^2$] of the diffractive optical element 40, which corresponds to the laser light source 20 that emits a laser light having the maximum radiant flux, satisfy the following relationship:

$$A_{max}\times(W_{min}/W_{max})\leq A_{min}.$$

According to this illumination device 10, a power density at each position of the diffractive optical element 40, which corresponds to the laser light source 20 that emits a laser light of a minimum radiant flux, and thus has a smaller planer dimension, can be lowered down to a power density not more than a power density at each position of the diffractive optical element 40, which corresponds to the laser light source 20 that emits a laser light of a maximum radiant flux, and thus has a larger planar dimension. Namely, a power density at each position of the diffractive optical element 40 having a smaller planar dimension can be sufficiently lowered, whereby the illumination device 10 can be effectively reduced in size while ensuring the safety.

Further, in the aforementioned embodiment, a planar dimension of the diffractive optical element 40, which corresponds to one optionally selected laser light source 20, is not more than a planar dimension of the diffractive optical element 40, which corresponds to another laser light source 20 that emits a laser light having a radian flux larger than that of a laser light emitted by the one laser light source 20. According to this illumination device 10, depending on values of radiant fluxes of laser lights emitted by the laser light sources 20, the diffractive optical elements 40 corresponding to the respective laser light sources 20 have different sizes. Thus, a power density can be made uniform to some extent among the respective diffractive optical elements 40. As a result, the planar dimension of the diffractive optical element 40 can be reduced as much as possible.

Further, in the aforementioned embodiment, the illumination device 10 further has the shaping optical system 30 that expands laser lights emitted from the laser light sources 20, and guides the laser lights to the diffractive optical elements 40. According to this illumination device 10, the lights emitted from the laser light sources 20 are expanded, and are then incident on the diffractive optical elements 40. Thus, a power density at each position of the diffractive optical element 40 can be effectively lowered, whereby the safety can be improved.

The aforementioned embodiment can be variously modified. A modification example is described herebelow with reference to the drawings. In the below description, a component that can be similarly structured as that of the above embodiment has the same reference number as the number used for the corresponding component of the above embodiment, and redundant description is omitted.

For example, in the aforementioned embodiment, the shaping optical systems 30 independent of one another are provided for the respective laser light sources 20. However, not limited thereto, the shaping optical system 30, or one or more elements of the lens 31 and the collimation lens 32 included in the shaping optical system 30 may be shared by the laser optical sources 20.

In addition, in the aforementioned embodiment, the illumination device 10 illuminates an elongated area. However, not limited thereto, the illumination device 10 may illuminate an area having a predetermined profile so as to function as a device that shows a predetermined profile. The predetermined profile may be an arrow, for example.

The invention claimed is:

1. A method of manufacturing an illumination device an illumination device, comprising:
    a step of preparing a first laser light source, and a second laser light source that emits a laser light having a radiant flux larger than that of a laser light emitted by the first laser light source;
    a step of preparing a first shaping optical system that expands the laser light emitted from the first laser light source, and a second shaping optical system that expands the laser light emitted from the second laser light source;
    a step of preparing a first diffractive optical element that diffracts the laser light emitted from the first laser light source and expanded by the first shaping optical system, and a second diffractive optical element that diffracts the laser light emitted from the second laser light source and expanded by the second shaping optical system; and
    a step of arranging the first laser light source, the second laser light source, the first shaping optical element, the second shaping optical element, the first diffractive optical element, and the second diffractive optical element, such that a first area illuminated by the laser light diffracted by the first diffractive optical element and a second area illuminated by the laser light diffracted by the second diffractive optical element are at least partially overlapped;
    wherein:
    a planar dimension of the first diffractive optical element is smaller than a planar dimension of the second diffractive optical element;
    the first shaping optical system has a collimation lens and the second shaping optical system has a collimation lens; and
    a planar dimension of the collimation lens of the first shaping optical system is smaller than a planar dimension of the collimation lens of the second shaping optical system.

2. The method of manufacturing an illumination device an illumination device according to claim 1, wherein:
    in the step of preparing the first laser light source and the second laser light source,
    a laser light source that emits a laser light of a blue emission wavelength range is prepared as the first laser light source, and
    a laser light source that emits a laser light of a red emission wavelength range is prepared as the second laser light source.

3. The method of manufacturing an illumination device an illumination device according to claim 2, wherein, in the step of preparing the first laser light source and the second laser light source, a third laser light source that emits a laser light of a wavelength range different from the first laser light source and the second laser light source is further prepared.

4. The method of manufacturing an illumination device an illumination device according to claim 1, wherein in the step of arranging the first laser light source, the second laser light source, the first shaping optical element, the second shaping optical element, the first diffractive optical element, and the second diffractive optical element, a distance from the first area to the first diffractive optical element is set larger than a distance from the second area to the second diffractive optical element.

5. The method of manufacturing an illumination device an illumination device according to claim 1, wherein the first laser light source and the second laser light source are arranged side by side on a common substrate.

6. An illumination method comprising a step of diffracting a laser light emitted from a first laser light source and expanded by a first shaping optical element, and diffracting a laser light emitted from a second laser light source and expanded by a second shaping optical element,
    wherein:
    a radiant flux of the laser light emitted from the first laser light source is smaller than a radiant flux of the laser light emitted from the second laser light source;
    a planar dimension of the first diffractive optical element is smaller than a planar dimension of the second diffractive optical element;
    the first shaping optical system has a collimation lens and the second shaping optical system has a collimation lens;
    a planar dimension of the collimation lens of the first shaping optical system is smaller than a planar dimension of the collimation lens of the second shaping optical system; and a first area illuminated by the laser light diffracted by the first diffractive optical element and a second area illuminated by the laser light diffracted by the second diffractive optical element are at least partially overlapped.

7. The illumination method according to claim 6, wherein:
the first laser light source emits a laser light of a blue emission wavelength range; and
the second laser light source emits a laser light of a red emission wavelength range.

8. The illumination method according to claim 7, wherein:
a laser light emitted from a third laser light source that emits a laser light of a wavelength range different from the first laser light source and the second laser light source is diffracted by a third diffractive optical element; and
a third area illuminated by the laser light diffracted by the third diffractive optical element, a second area, and a third area are at least partially overlapped.

9. The illumination method according to claim 6, wherein a distance from the first area to the first diffractive optical element is set larger than a distance from the second area to the second diffractive optical element.

10. The illumination method according to claim 6, wherein the first laser light source and the second laser light source are arranged side by side on a common substrate.

11. An illumination device that illuminates a road surface, comprising:
a first laser light source and a second laser light source;
a first shaping optical system that expands a laser light emitted from the first laser light source;
a first diffractive optical element that diffracts the laser light emitted from the first laser light source and expanded by the first shaping optical system;
a second shaping optical system that expands a laser light emitted from the second laser light source; and
a second diffractive optical element that diffracts the laser light emitted from the second laser light source and expanded by the second shaping optical system;
wherein:
the first laser light source emits a laser light having a radiant flux smaller than that of a laser light emitted from the second laser light source;
a planar dimension of the first diffractive optical element is smaller than a planar dimension of the second diffractive optical element;
the first shaping optical system has a collimation lens and the second shaping optical system has a collimation lens;
a planar dimension of the collimation lens of the first shaping optical system is smaller than a planar dimension of the collimation lens of the second shaping optical system; and
a distance from the road surface to the first diffractive optical element is larger than a distance from the road surface to the second diffractive element.

12. The illumination device according to claim 11, wherein the first laser light source and the second laser light source emit laser lights of different wavelength ranges.

* * * * *